US012111016B2

(12) United States Patent
Yoon et al.

(10) Patent No.: US 12,111,016 B2
(45) Date of Patent: Oct. 8, 2024

(54) CORNER STRUCTURE OF LIQUEFIED GAS STORAGE TANK

(71) Applicant: KOREA GAS CORPORATION, Daegu (KR)

(72) Inventors: Ihn Soo Yoon, Incheon (KR); Eun Young Yun, Incheon (KR); Young Kyun Kim, Incheon (KR); Byung Taek Oh, Incheon (KR); Yeong Beom Lee, Incheon (KR); Hae Chul Han, Incheon (KR); Ki Ho Yim, Seoul (KR); Yong Keun Yoon, Incheon (KR)

(73) Assignee: KOREA GAS CORPORATION, Daegu (KR)

( * ) Notice: Subject to any disclaimer, the term of this patent is extended or adjusted under 35 U.S.C. 154(b) by 245 days.

(21) Appl. No.: 17/783,646

(22) PCT Filed: Sep. 2, 2020

(86) PCT No.: PCT/KR2020/011755

§ 371 (c)(1),
(2) Date: Jun. 9, 2022

(87) PCT Pub. No.: WO2021/118014

PCT Pub. Date: Jun. 17, 2021

(65) Prior Publication Data

US 2022/0390069 A1 Dec. 8, 2022

(30) Foreign Application Priority Data

Dec. 10, 2019 (KR) ........................ 10-2019-0163596

(51) Int. Cl.
*F17C 3/02* (2006.01)
*B63B 25/12* (2006.01)

(52) U.S. Cl.
CPC .............. *F17C 3/027* (2013.01); *B63B 25/12* (2013.01); *F17C 2201/0157* (2013.01);
(Continued)

(58) Field of Classification Search
None
See application file for complete search history.

(56) References Cited

U.S. PATENT DOCUMENTS 5,450,806 A * 9/1995 Jean ...................... F17C 13/004 220/901
6,145,690 A * 11/2000 Dhellemmes ........... F17C 3/025 220/560.07

(Continued)

FOREIGN PATENT DOCUMENTS

CN 101059202 10/2007
CN 101134498 3/2008

(Continued)

OTHER PUBLICATIONS

WO-2017014426-A1 English Machine Translation (Year: 2017).*

(Continued)

*Primary Examiner* — Jenna M Maroney
(74) *Attorney, Agent, or Firm* — JCIPRNET

(57) ABSTRACT

A corner structure of a liquefied gas storage tank is provided, wherein the corner structure is installed at a corner of the storage tank for storing liquefied gas to support sealing walls. The corner structure includes: a stationary member secured to an inner surface of a hull structure wall; a movable member disposed on the stationary member such that the sealing walls are joined thereto; and an insulating member interposed between the sealing walls and the hull structure wall. The stationary member includes a stationary member body bent at a curved portion thereof in an opposite direction to the movable member, and the movable member
(Continued)

includes a movable member body bent at a bent portion thereof in an opposite direction to the stationary member. The stationary member and the movable member are coupled to each other by a fastening member that penetrates the curved portion and the bent portion.

10 Claims, 7 Drawing Sheets

(52) U.S. Cl.
CPC ................. *F17C 2203/0333* (2013.01); *F17C 2221/033* (2013.01); *F17C 2260/036* (2013.01); *F17C 2270/0107* (2013.01)

(56) References Cited

U.S. PATENT DOCUMENTS

| | | | | |
|---|---|---|---|---|
| 2007/0028823 | A1 | 2/2007 | Yang et al. | |
| 2017/0227164 | A1* | 8/2017 | Han .......................... | F17C 3/04 |

FOREIGN PATENT DOCUMENTS

| | | | | |
|---|---|---|---|---|
| CN | 109630879 | | 4/2019 | |
| JP | 2006300320 | | 11/2006 | |
| KR | 100499710 | | 7/2005 | |
| KR | 100649317 | | 11/2006 | |
| KR | 20090131331 | | 12/2009 | |
| KR | 1020160017525 | | 2/2016 | |
| KR | 20160091649 | | 8/2016 | |
| KR | 20170050584 | | 5/2017 | |
| KR | 101865167 | | 6/2018 | |
| KR | 1020190064046 | | 6/2019 | |
| KR | 20200023478 | A * | 3/2020 | |
| WO | WO-2017014426 | A1 * | 1/2017 | ............. B63B 25/16 |

OTHER PUBLICATIONS

KR-20200023478-A English Machine Translation (Year: 2020).*

“International Search Report (Form PCT/ISA/210) of PCT/KR2020/011755,” mailed on Mar. 3, 2021, with English translation thereof, pp. 1-6.

“Search Report of Europe Counterpart Application”, issued on Jan. 24, 2024, p. 1-p. 7.

* cited by examiner

CORNER STRUCTURE OF LIQUEFIED GAS STORAGE TANK

CROSS-REFERENCE TO RELATED APPLICATION

This application is a 371 of international application of PCT application serial no. PCT/KR2020/011755, filed on Sep. 2, 2020, which claims the priority benefit of Korea application no. 10-2019-0163596, filed on Dec. 10, 2019. The entirety of each of the above mentioned patent applications is hereby incorporated by reference herein and made a part of this specification.

TECHNICAL FIELD

The present invention relates to a corner structure of a liquefied gas storage tank, and more particularly to a corner structure arranged so as to allow installation of an insulating wall and a sealing wall on an inner wall surface of a storage tank for storage of liquefied gas that is a liquid in a cryogenic state.

BACKGROUND ART

In general, liquefied gas includes liquefied natural gas (LNG), liquefied petroleum gas (LPG), liquefied ethane gas, liquefied ethylene gas, liquefied nitrogen, liquefied carbon dioxide, liquefied ammonia, and the like.

For example, LNG is obtained through liquefaction of natural gas, which is a fossil fuel, and LNG storage tanks are divided into onshore storage tanks installed on the ground or buried underground, mobile storage tanks installed in transportation means, such as automobiles and ships, and the like, depending on installation locations thereof.

Such liquefied gas including LNG and LPG has a risk of explosion when exposed to impact and is stored in a cryogenic state. Thus, a storage tank for storing the liquefied gas has a structure capable of firmly maintaining impact resistance and liquid tightness.

As compared to an onshore storage tank subjected to little flow, liquefied gas storage tanks provided to vehicles and ships subjected to flow are required to sustain mechanical stress caused by the flow. However, since a liquefied gas storage tank provided to ships having countermeasures against mechanical stress is also applied to the onshore storage tank, a structure of the liquefied gas storage tank provided to the ships will be described by way of example.

FIG. 1 is a schematic sectional view of a ship provided with a typical LNG storage tank.

Referring to FIG. 1, the ship provided with the LNG storage tank has a double-structure hull composed of an outer wall (16) forming an outer shape and an inner wall (12) formed inside the outer wall (16). In the ship (1), the inner wall (12) is integrally connected to the outer wall (16) by reinforcing members (13), such as connection ribs and the like. In some cases, the ship may have a single-structure hull without the inner wall (12).

The interior of the hull, that is, the interior of the inner wall (12), may be divided by at least one partition (14). The partition (14) may be formed by a well-known cofferdam, which is provided to a typical LNG transportation ship (1).

Each of the interior spaces divided by the partition (14) may be used as a storage tank (10) that stores a cryogenic liquid, such as LNG and the like.

Here, an inner peripheral wall of the storage tank (10) is sealed in a liquid-tight state by a sealing wall (50). That is, the sealing wall (50) defines a single storage space by integrally connecting metal boards to one another through welding. As a result, the storage tank (10) can store and transport LNG without leakage.

As well-known in the art, the sealing wall (50), which direct contacts LNG in a cryogenic state, may be formed with corrugations to resist against temperature change according to loading or unloading of the LNG.

Such a sealing wall (50) is fixedly connected to the inner wall (12) or the partition (14) of the ship (1) by a plurality of anchor structures (30). Thus, the sealing wall (50) cannot be moved relative to the hull.

An insulating wall is disposed between the sealing wall (50) and the inner wall (12) or the partition (14) to form an insulating layer. The insulating wall is composed of corner structures (20) disposed at corners of the storage tank (10), anchor structures (30) disposed around anchor members (not shown), and planar structures (40) disposed on a flat portion of the storage tank (10). That is, the entire insulating layer may be formed on the storage tank (10) by the corner structures (20), the anchor structures (30) and the planar structures (40).

Here, the anchor structure (30) is composed of bar-shaped anchor members, which directly connect the hull to the sealing wall, and insulators disposed around the anchor members.

The sealing wall (50) is mainly supported by the anchor structures (30). The corner structures (20) and the planar structures (40) support only load of the LNG applied to the sealing wall (50) and are not directly connected to the anchor structures (30).

FIG. 2 is a sectional view of part of a conventional LNG storage tank disclosed in Korean Patent No. 499710.

Referring to FIG. 2, in a conventional LNG storage tank (10), secondary insulating walls (22, 32, 42) and primary insulating walls (24, 34, 44) are sequentially provided to an inner wall (12) or a partition, which constitutes a portion of a hull, and secondary seal walls (23, 33, 43) are disposed between the secondary insulating walls (22, 32, 42) and the primary insulating walls (24, 34, 44). In addition, a primary sealing wall (50) is disposed on the primary insulating walls (24, 34, 44).

With this structure, the LNG storage tank (10) includes corner structures (20) disposed at inner corners thereof, anchor structures (30) arranged at constant intervals on a bottom surface thereof, and planar structures (40) each inserted into a space between the corner structures (20) or the anchor structures (30) to slide therein. Here, each of the corner structure (20), the anchor structure (30) and the planar structure (40) is manufactured in the form of a unit module to be assembled with the storage tank (10) and the primary sealing wall (50) is disposed thereon to secure liquid-tightness of the insulating wall, thereby providing a space capable of storing LNG therein.

As shown in FIG. 2, the corner structure (20), the anchor structure (30) and the planar structure (40) include primary insulating walls (24, 34, 44), secondary insulating walls (22, 32, 42), and secondary sealing walls (23, 33, 43), respectively, which are commonly defined as insulating wall structures (20, 30, 40).

In each of the insulating wall structures (20, 30, 40), the secondary sealing wall of each unit module is bonded to each of the insulating walls by a bonding agent to be integrally formed therewith. Typically, the secondary insulating walls (22, 32, 42) are composed of polyurethane foam, which is an insulator, and a board attached to a lower side of the polyurethane foam. In addition, the primary insulating walls (24, 34, 44) are composed of polyurethane foam and a board attached to an upper side of the polyurethane foam by a bonding agent. Further, the primary sealing wall is disposed on the primary insulating walls (24, 34, 44) and secured to the anchor structure (30) by welding.

In addition, the secondary insulating wall (42) of the planar structure (40) is formed at a lower end thereof with a flange (42*a*) having a larger size than the secondary insulating wall (42). The flange (42*a*) is inserted into a groove formed at a lower end of the anchor structure (30) to slide therein.

In this example, each of the anchor structures (30) is provided with an anchor support rod (36), a securing member (37) placed at a lower portion of the anchor structure, an anchor secondary insulating wall (32), and an anchor primary insulating wall (34), in which a secondary sealing wall (33) is disposed between the anchor secondary insulating wall (32) and the anchor primary insulating wall (34) to connect the anchor secondary insulating wall (32) to the anchor primary insulating wall (34). The anchor support rod (36) is connected at one end thereof to the primary sealing wall (50) and at the other end thereof to the inner wall (12) of the hull by the securing member (37).

The anchor structure (30) is coupled to an upper end of the anchor support rod (36) by welding the primary sealing wall (50) thereto.

In addition, the anchor structure (30) is placed at a connection point between adjacent planar structures (40) to connect the adjacent planar structures (40) to each other and the planar structures (40) are secured to the inner wall (12) or the partition (14) of the hull, which constitutes the storage tank (10). Further, the securing member (37) of the anchor structure (30) is disposed around the anchor support rod (36).

However, in the conventional LNG storage tank, the structure of the insulating walls is composed of the primary and secondary insulating walls and the primary and secondary sealing walls, thereby providing a complicated constitution and a complicated structure for connection between the secondary sealing walls while causing difficulty in installation of the insulating wall. Moreover, due to complexity of the anchoring structure or the secondary sealing walls and difficulty in installation thereof, there can be a problem of leakage of LNG through deterioration in LNG sealing reliability of the sealing walls.

Moreover, the conventional corner structure (20) configured to support only the load of LNG applied to the sealing wall (50) and not joined to the sealing wall (50) is required to improve absorption of stress generated upon thermal deformation of the storage tank or deformation of the hull caused by loading or unloading of the LNG which is in a cryogenic state.

DISCLOSURE

Technical Problem

It is an aspect of the present invention to provide an improved corner structure of a liquefied gas storage tank, which can simplify structures of insulating walls and sealing walls and a coupling structure therebetween to allow easy sealing operation while improving sealing reliability, can reduce a construction time of the storage tank through simplification of an assembly structure and a manufacturing process, and can more efficiently relieve mechanical stress generated at corners in the storage tank.

Technical Solution

In accordance with one aspect of the present disclosure, there is provided a corner structure disposed at a corner of a liquefied gas storage tank and supporting a sealing wall adapted to prevent leakage of liquefied gas, the corner structure including: a stationary member secured to an inner surface of a hull structure wall; a movable member disposed on the stationary member such that the sealing wall is joined to the movable member; and an insulating member interposed between the sealing wall and the hull structure wall, wherein the stationary member includes a stationary member body bent at a curved portion thereof in an opposite direction to the movable member and the movable member includes a movable member body bent at a bent portion thereof in an opposite direction to the stationary member; and wherein the stationary member is coupled to the movable member by a fastening member penetrating the curved portion and the bent portion.

The stationary member may further include: a secured portion fixedly mounted on the hull structure wall; and flanges formed at opposite ends of the stationary member body to be coupled to the secured portion. The secured portion may include a stud inserted into securing holes formed in the flanges.

The stationary member may further include a fitting member of plywood interposed between the secured portion and the flanges upon coupling between the secured portion and the flanges.

The stationary member may further include a stationary member-side fastening block disposed at the curved portion of the stationary member body to allow the fastening member having passed through the movable member body and the stationary member body to be fastened to the stationary member-side fastening block. The stationary member-side fastening block may be disposed on an opposite surface to the movable member at the curved portion of the stationary member body.

The movable member may further include a movable member-side fastening block at the bent portion of the movable member body to allow the fastening member having passed through the movable member body and the stationary member body to be inserted into the movable member-side fastening block. The movable member-side fastening block may be disposed on an opposite surface to the stationary member at the bent portion of the movable member body.

The movable member may further include a joining portion to which the sealing wall is joined. The joining portion may include a primary joining portion and a secondary joining portion with a height different therebetween, and the sealing wall comprises a primary membrane directly contacting liquefied gas and a secondary membrane spaced apart from the primary membrane by a constant distance. The primary membrane may be joined to the primary joining portion and the secondary membrane may be joined to the secondary joining portion.

The primary joining portion may be formed on a protrusion protruding from a surface of the movable member body and the secondary joining portion may be formed on the surface of the movable member body.

One movable member may be coupled to the hull structure wall through multiple stationary members.

The stationary members may be coupled to a central portion and opposite ends of the movable member, respectively. For coupling between the stationary members and the movable member, the movable member body may be formed at the central portion and the opposite ends with coupling holes through which the fastening members pass, respectively. The coupling hole formed at the central portion of the movable member body may have a circular shape and the coupling holes formed at the opposite ends of the movable member body may have an elongated-hole shape extending in a longitudinal direction of the movable member body.

The movable member may further include a high density insulator disposed at the bent portion of the movable member body and supporting the sealing wall.

In accordance with another aspect of the present invention, there is provided a liquefied gas storage tank including a corner structure disposed at a corner thereof to support a sealing wall adapted to prevent leakage of liquefied gas, wherein he corner structure including: a stationary member secured to an inner surface of a hull structure wall; a movable member disposed on the stationary member such that the sealing wall is joined to the movable member; and an insulating member interposed between the sealing wall and the hull structure wall, wherein the stationary member is coupled to the movable member by a fastening member penetrating the stationary member and the movable member.

The sealing wall may include a primary membrane directly contacting liquefied gas and a secondary membrane spaced apart from the primary membrane by a constant distance, and a support board may be interposed between the primary membrane and the secondary membrane to maintain a constant distance therebetween.

Advantageous Effects

As described above, the present invention provides an improved corner structure of a liquefied gas storage tank, which can simplify structures of insulating walls and sealing walls and a coupling structure therebetween to allow easy sealing operation while improving sealing reliability, can reduce a construction time of the storage tank through simplification of an assembly structure and a manufacturing process, and can more efficiently relieve mechanical stress generated at corners in the storage tank.

MODE FOR INVENTION

Hereinafter, preferred embodiments of the present invention will be described in detail with reference to the accompanying drawings. It should be understood that the following embodiment may be modified in various ways and the present invention is not limited thereto.

Figure 1:
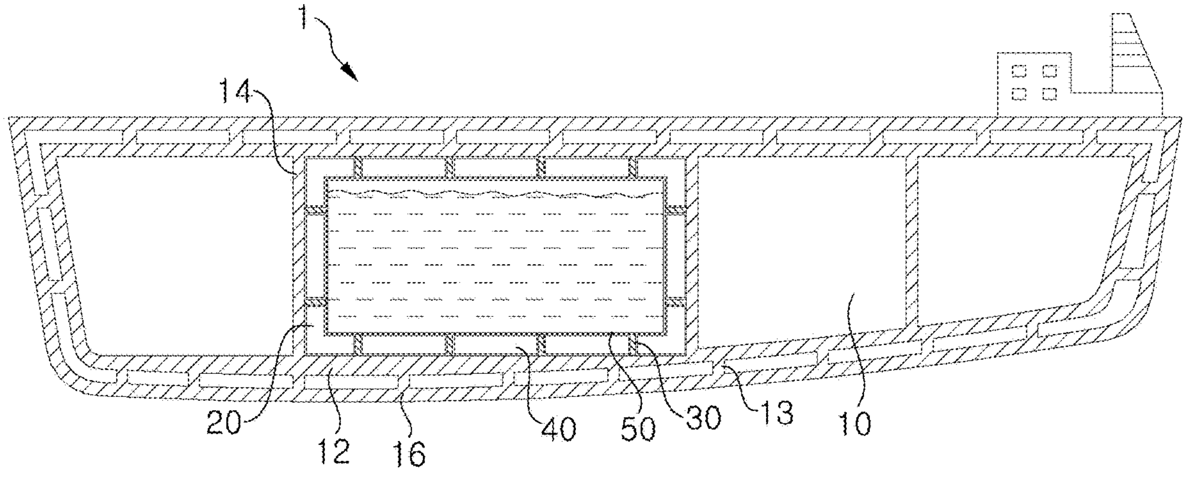
FIG. 1(Prior Art)
FIG. 1 is a schematic sectional view of a ship provided with a typical LNG storage tank.
Figure 3:
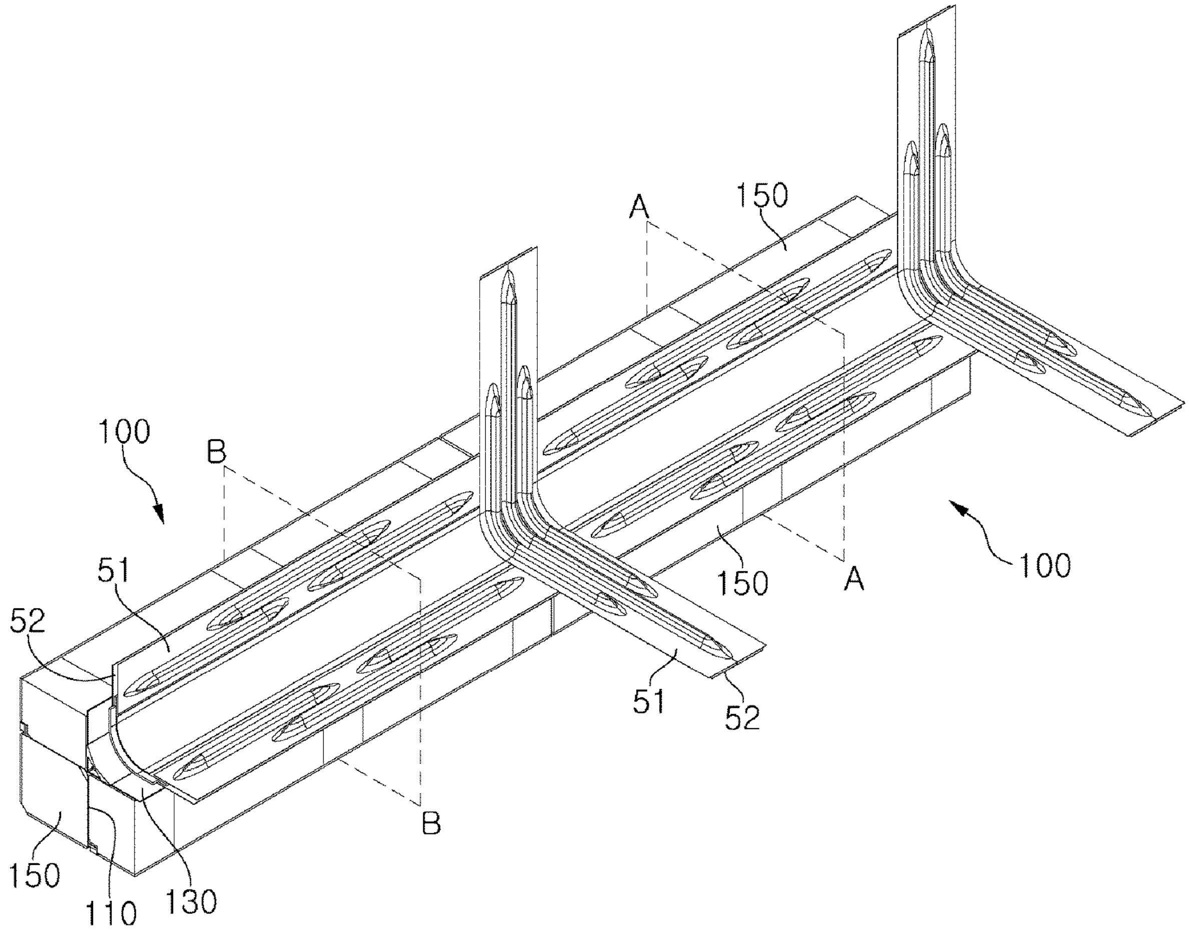
FIG. 3 is a perspective view of a corner structure according to a preferred embodiment of the present invention, illustrating both primary and secondary membranes.
Figure 4:
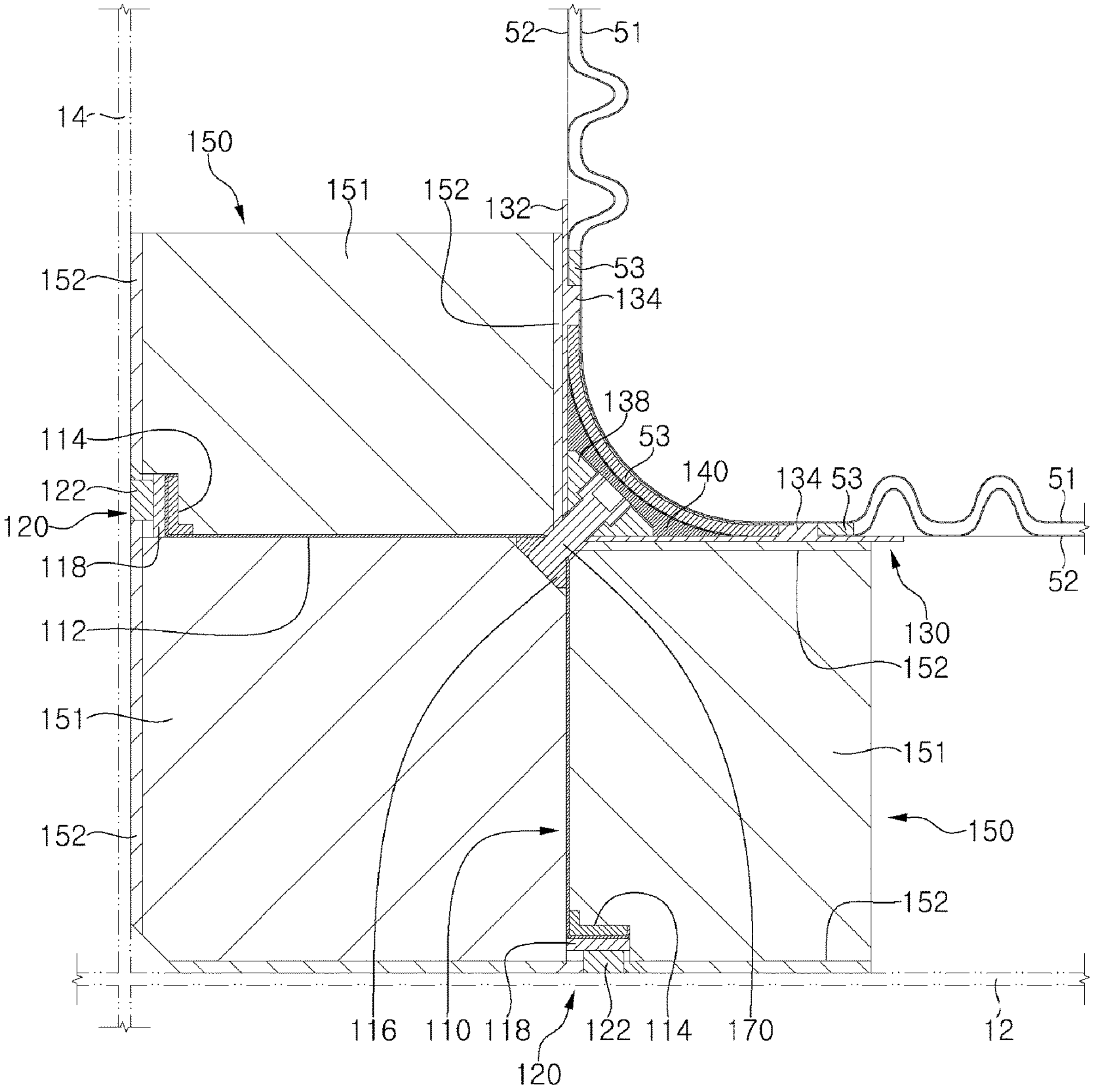
FIG. 4 is a cross-sectional view taken along line A-A of FIG. 3.
Figure 5:
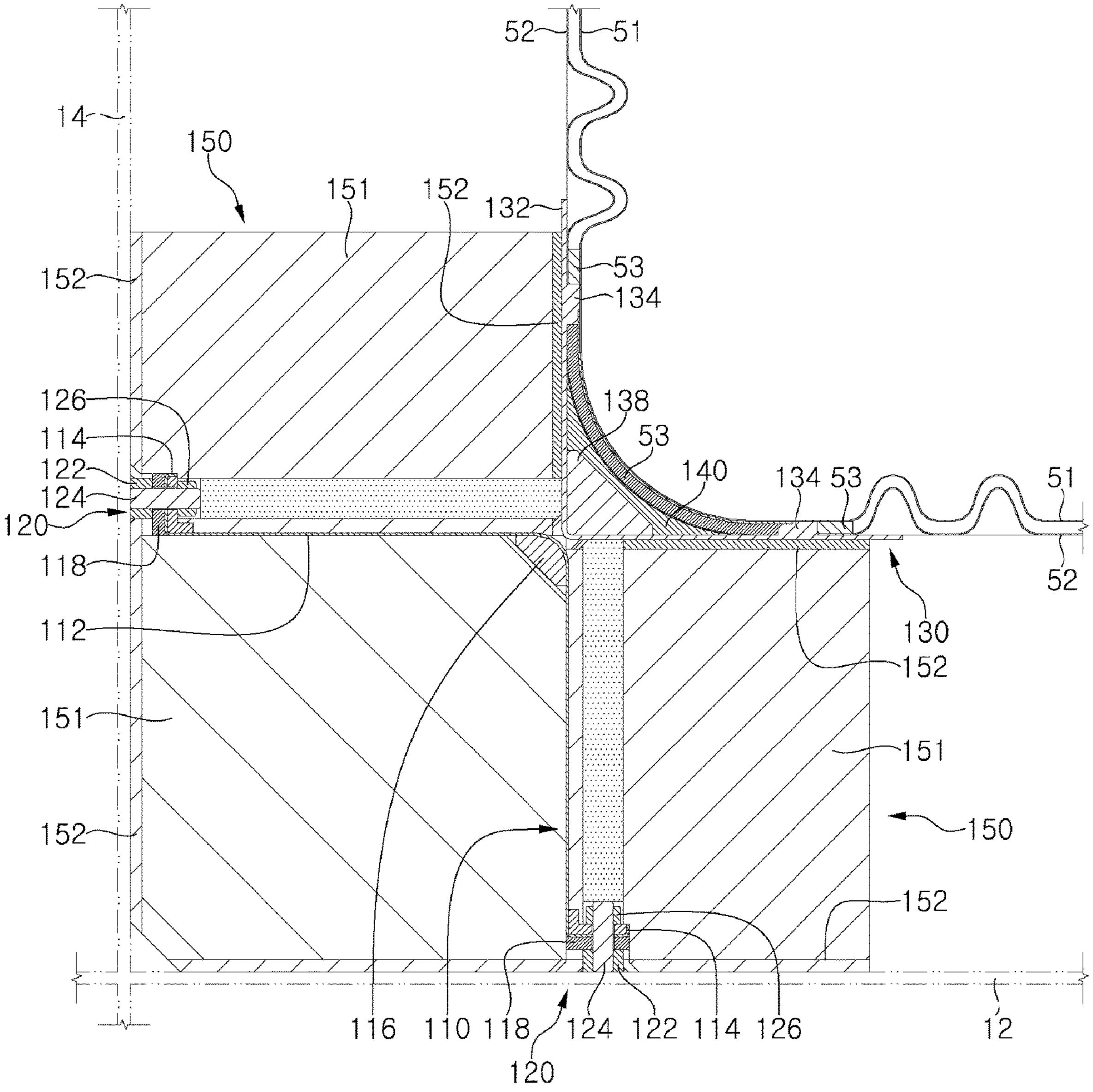
FIG. 5 is a cross-sectional view taken along line B-B of FIG. 3.

As shown in FIG. 3 to FIG. 5, a corner structure (100) according to a preferred embodiment of the invention includes: a stationary member (110) secured to a wall dividing a hull interior space, that is, to a surface of a hull structure wall, such as an inner wall (12; see FIG. 1) or a partition (14; see FIG. 1), such that a storage tank (10; see FIG. 1) can be installed in the hull interior space; a movable member (130) supported on the stationary member (110) such that sealing membranes (51, 52) can be joined to the movable member (130); and insulating members (150) disposed around the stationary member (110) to secure thermal insulation.

FIG. 3 is a perspective view illustrating two corner structures (100) according to the preferred embodiment, which are consecutively joined to each other, and primary and secondary membranes (51, 52) joined to upper sides of the corner structures (100). It should be understood that the primary and secondary membranes (51, 52) are not limited to the shapes shown in FIG. 3. FIG. 4 is a cross-sectional view taken along line A-A of FIG. 3 and FIG. 5 is a cross-sectional view taken along line B-B of FIG. 3. The cross-sectional view of FIG. 4 illustrates the corner structures (100) assembled with each other by fastening members (170) and the cross-sectional view of FIG. 5 illustrates a connection relationship between the corner structures (100) and hull structure walls (12, 14).

Here, the movable member is disposed to undergo minute displacement with respect to the stationary member, as described below, when thermal deformation caused by temperature change due to loading of LNG in a cryogenic state or deformation of the hull by waves and the like occurs. That is, the movable member and the stationary member are constructed to undergo relative displacement with respect to each other.

As shown in FIG. 4 to FIG. 8, the stationary member (110) may include a stationary member body (112), which has an L shape bent substantially at a right angle in side view. The stationary member (110) has a cross-sectional shape bent at a curved portion thereof in an opposite direction to the movable member (130). The stationary member (110) may further include a secured portion (120) secured to a hull side (for example, to the inner wall (12) or the partition (14)) by, for example, welding. The stationary member (110) may further include flanges (114) formed at opposite ends of the stationary member body (112) to be coupled to the secured portion (120).

Figure 6:
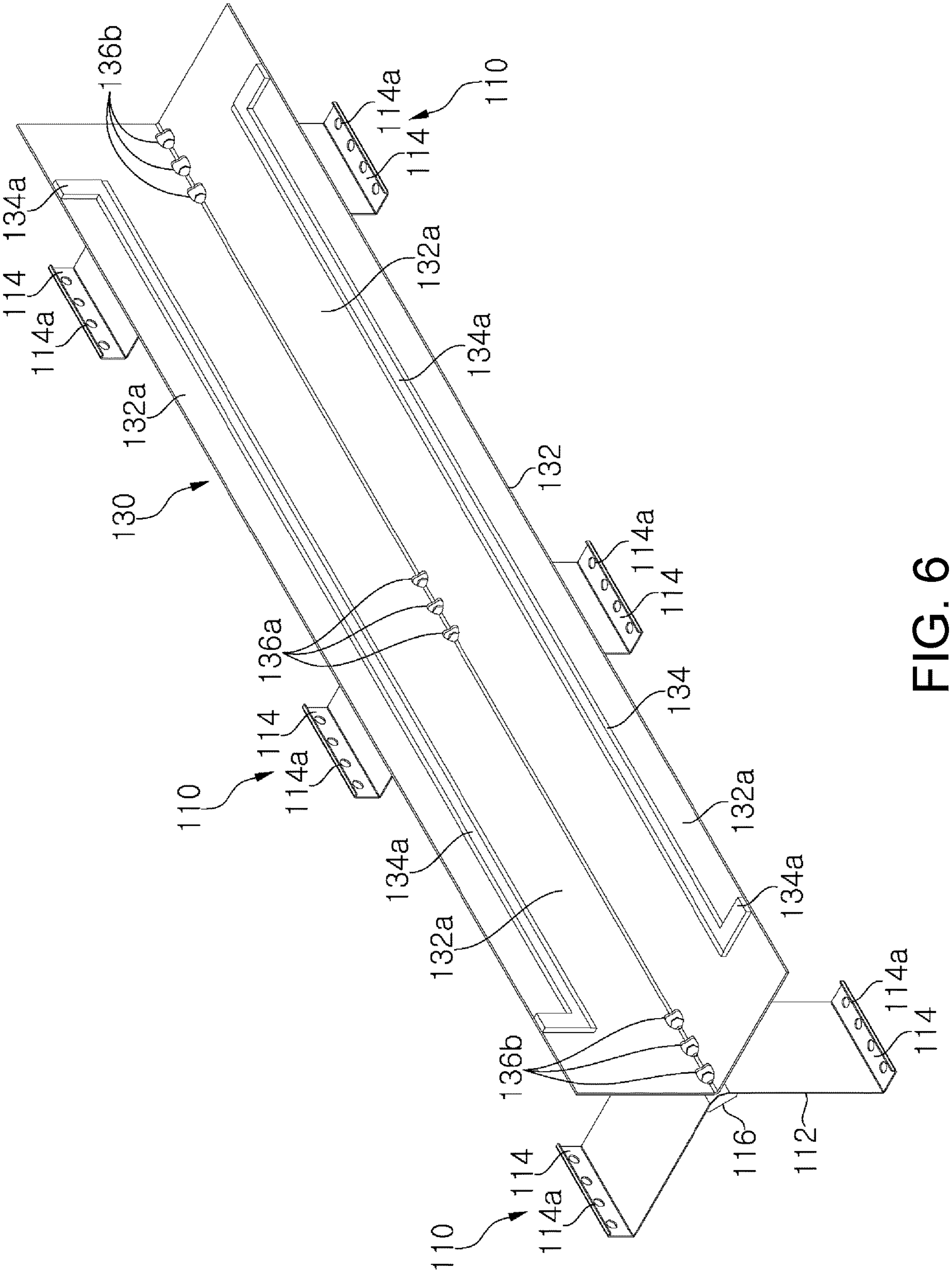
FIG. 6 is a perspective view of the corner structure according to the preferred embodiment of the present invention, with the primary and secondary membranes removed therefrom.
Figure 7:
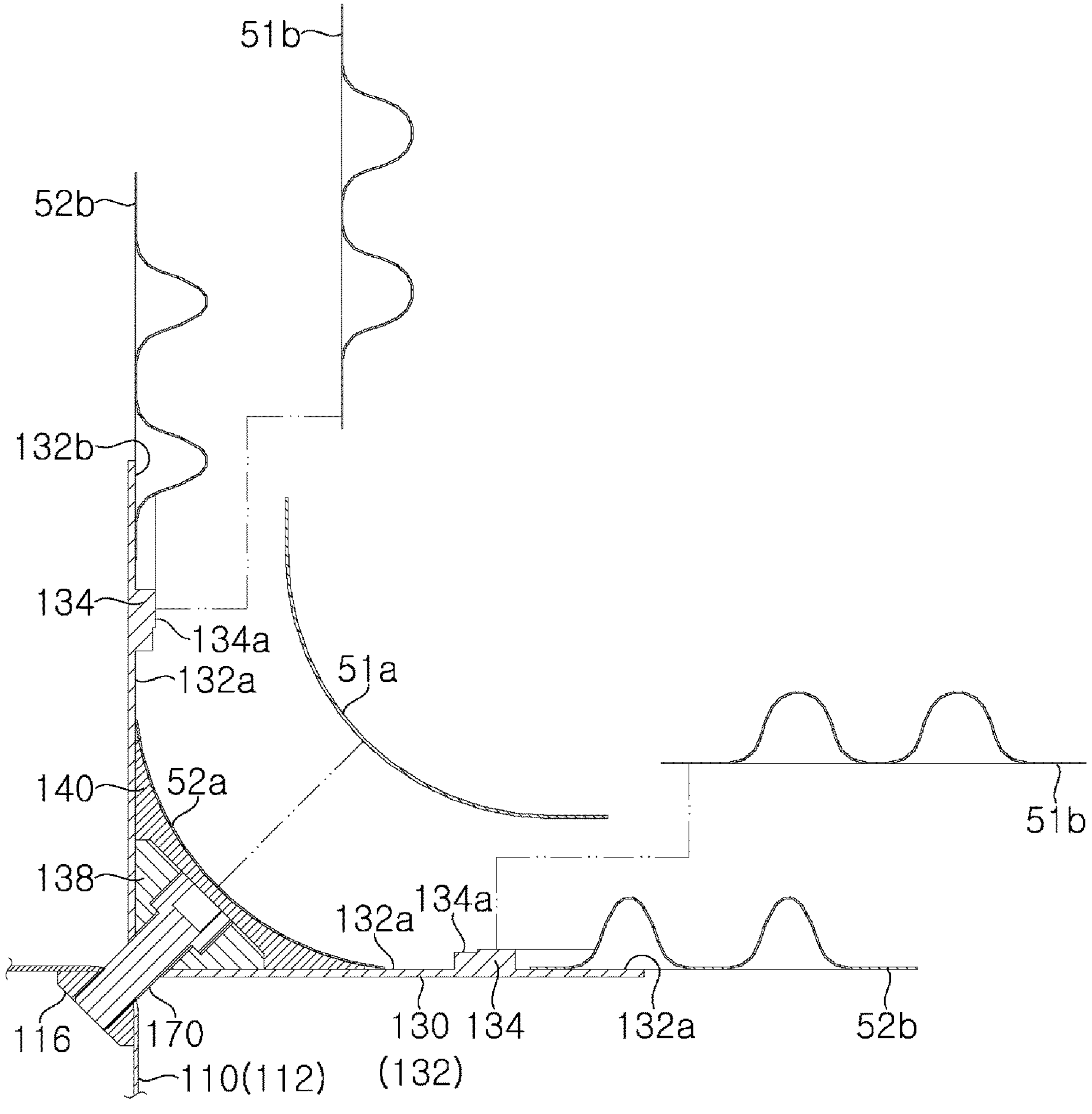
FIG. 7 is a cross-sectional view of a main part of the corner structure according to the preferred embodiment of the present invention, illustrating a joined state between the primary membrane and the secondary membrane.
Figure 8:
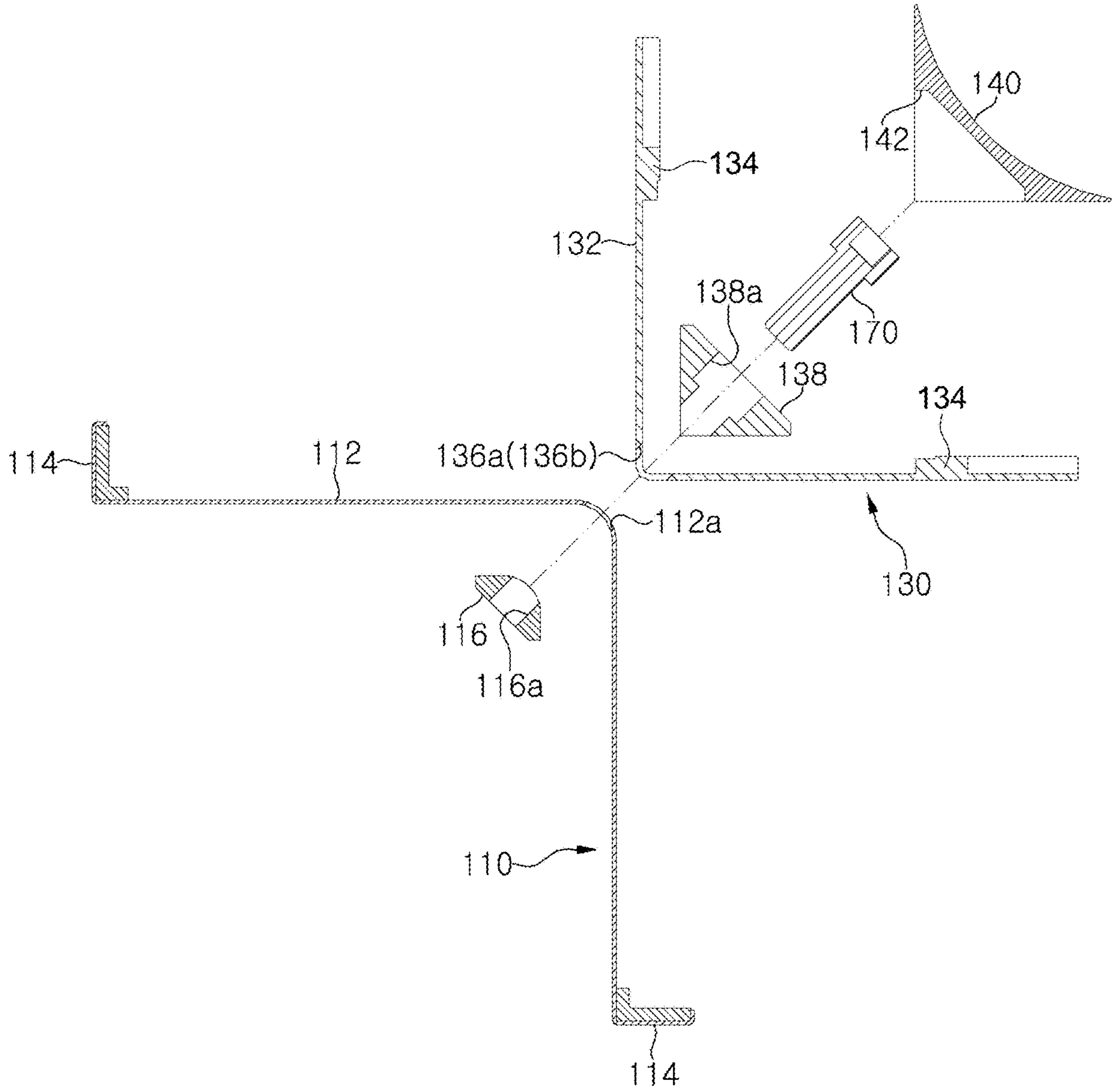
FIG. 8 is an exploded sectional view of the corner structure according to the preferred embodiment of the present invention.

FIG. 6 is a perspective view of the corner structure (100) according to the preferred embodiment of the present invention, with all of the insulating members (150) removed therefrom. Unlike FIG. 3, FIG. 6 does not show the primary and secondary membranes and the secured portion (120). FIG. 7 is a cross-sectional view of a main part of the corner structure (100) according to the preferred embodiment of the present invention, illustrating a joined state between the primary and secondary membranes (51, 52). For convenience of description, FIG. 7 does not show a support board (53; see FIG. 4 and FIG. 5) that is interposed between the primary and secondary membranes (51, 52) to support load from cargo while maintaining a space therebetween. FIG. 8 is an exploded sectional view of the main part of the corner structure (100) according to the preferred embodiment of the present invention, illustrating the stationary member (110) and the movable member (130) assembled with each other through the fastening member (170).

The stationary member body (112) may be manufactured by bending, for example, a substantially rectangular board at an angle of about 90 degrees. The stationary member body (112) may be formed at the curved portion thereof with at least one through-hole (112*a*) into which the fastening member (170) described below is inserted.

In addition, a stationary member-side fastening block (116) formed with a fastening hole (116*a*) may be placed at the curved portion of the stationary member body (112) such that the fastening member (170) having passed through the through-hole (112*a*) of the stationary member (110) can be fastened to the stationary member-side fastening block therethrough. Since an insulator neither has sufficient strength to maintain a fastening state of the fastening member (170) nor allows formation of threads thereon, it is not desirable that the fastening member (170) is inserted into the insulator. The number of through-holes (112*a*) on the stationary member (110) is the same as the number of fastening holes (116*a*) on the stationary member-side fastening block (116) and the through-holes (112*a*) are aligned with the fastening holes (116*a*) such that the fastening members (170) can be inserted thereinto. The stationary member-side fastening block (116) and the stationary member body (112) may be integrally formed with each other or may be individually prepared as separate components to be assembled with each other. The stationary member-side fastening block (116) may be formed of a material, for example, stainless steel (STS), which can maintain a fastening state of the fastening members (170).

As shown in FIG. 5, the secured portion (120) of the stationary member (110) may include a securing block (122), which is secured to the hull by, for example, welding, with the securing block (122) directly adjoining the hull, and a stud (124) inserted into the securing block (122). Although FIG. 5 illustrates the secured portion (120) composed of the securing block (122) and the stud (124) provided as separate components, it should be understood that the secured portion is not limited thereto. Alternatively, the secured portion may be composed of the securing block (122) and the stud (124) integrally formed with each other or may be composed of the stud without the securing block. The secured portion (120) may be previously mounted at a predetermined location on the hull before installation of the corner structure.

The flanges (114) of the stationary member (110) are disposed at the opposite ends of the stationary member body (112). The stationary member body (112) may be integrally formed with the flanges (114). Alternatively, the stationary member body (112) and the flanges (114) may be provided as separate components. The flanges (114) may extend from the stationary member body (112) so as to be orthogonal thereto. Each of the flanges (114) is formed with securing holes (114*a*) into which the studs (124) of the secured portion (120) are inserted. The number of securing holes (114*a*) is the same as the number of studs (124).

The secured portion (120) and the flanges (114) are coupled to each other by inserting the studs (124) of the secured portion (120) into the securing holes (114*a*) formed in each of the flanges (114), followed by fastening nuts (126) to the studs (124). That is, each of the flanges (114) may be formed with multiple securing holes (114*a*) arranged at constant intervals, whereby the studs (124) of the secured portion (120) secured to an inner surface of the hull structure wall can be secured to the securing holes (114*a*) by the nuts (126).

A fitting member (118) formed of a plywood material may be interposed between the securing block (122) of the secured portion (120) and the flange (114) to reduce the area of a heat transfer path.

Referring to FIG. 4 to FIG. 8, in side view, the movable member (130) may have an L-shape movable member body (132) bent substantially at a right angle opposite to the stationary member body (112). That is, the movable member (130) has a cross-sectional shape bent at a bent portion thereof in an opposite direction to the stationary member (110).

The sealing membranes (51, 52) may be joined to the movable member body (132). As described above, the sealing membranes include a primary membrane (51) disposed to directly contact liquefied gas and forming the primary sealing wall and a secondary membrane (52) forming the secondary sealing wall. The movable member body (132) may be formed with a primary joining portion (134*a*) and a secondary joining portion (132*a*) such that the primary membrane (51) can be joined to the secondary membrane (52) by, for example, welding so as to be separated a constant distance from each other. As best shown in FIG. 7, the primary joining portion (134*a*) is formed on a protrusion (134) protruding from a surface of the movable member body (132) and the secondary joining portion (132*a*) is formed on the surface of the movable member body (132). A height of the protrusion (134) may be the same as a distance between the primary membrane (51) and the secondary membrane (52). The protrusion (134) may be integrally formed with the movable member body (132) or may be provided as a separate component to be attached to the movable member body (132).

The support board (53) may be interposed between the primary membrane (51) and the secondary membrane (52) to maintain the distance therebetween while supporting load from cargo. The support board (53) may be manufactured using, for example, a plywood material.

The primary membrane (51) may include a primary curved portion (51*a*) rounded in a substantially arc cross-sectional shape to be joined to the bent portion of the movable member body (132) bent at 90 degrees and a primary planar portion (51*b*) formed to have a flat shape. Likewise, the secondary membrane (52) may include a secondary curved portion (52*a*) rounded in a substantially arc cross-sectional shape to be joined to the bent portion of the movable member body (132) bent at 90 degrees and a secondary planar portion (52*b*) formed to have a flat shape. A support board interposed between the primary planar portion (51*b*) and the secondary planar portion (52*b*) has a flat shape and a support board interposed between the primary curved portion (51*a*) and the secondary curved portion (52*a*) has a roundly curved board shape.

Three stationary members (110) may be coupled to a single movable member (130) and may be coupled to a central portion and opposite ends of the movable member (130). The stationary members (110) and the movable member (130) are coupled to one another to form a cross (+) shape in side view (see FIG. 4 and FIG. 5).

For coupling between the stationary members (110) and the movable member (130), the bent portion of the movable member body (132) may be formed at the central portion thereof and at the opposite ends thereof with coupling holes (136*a*, 136*b*) through which the fastening members (170) pass. The coupling holes (136*a*) formed at the central portion of the movable member body (132) have a circular shape, whereas the coupling holes (136*b*) formed at the opposite ends of the movable member body (132) may have an elongated-hole shape extending in a longitudinal direction of the movable member body (132).

As described above, the movable member (130) and the stationary members (110) may be displaced relative to each other due to deformation of the hull or the membrane upon loading and unloading of cargo or upon generation of external force at sea. Upon occurrence of displacement, the presence of the coupling holes (136*b*) having an elongated-hole shape can absorb displacement of the movable member at the opposite ends thereof while preventing movement of the movable member at the central portion thereof. That is, when shrinkage of the membranes (51, 52) occurs due to thermal deformation upon loading of liquefied gas, the movable member (130) joined to the membranes (51, 52) can also shrink. Here, the opposite ends of the movable member (130) may be displaced while slightly sliding towards the central portion thereof formed with the coupling holes (136*a*). As described above, since the coupling holes (136*b*) formed at the opposite ends of the movable member (130) have an elongated-hole shape, fastening of the fastening members (170) thereto does not obstruct shrinkage and expansion of the movable member (130).

Further, the bent portion of the movable member body (132) may be provided with a movable member-side fastening block (138) formed with fastening holes (138*a*) to allow the fastening members (170) used for coupling between the stationary members (110) and the movable member (130) to maintain a stable fastening state. Since an insulator neither has sufficient strength to maintain the fastening state of the fastening members (170) nor allows formation of threads thereon, it is not desirable that the fastening members (170) are inserted into the insulator. The coupling holes (136*a*, 136*b*) of the movable member (130) are aligned with the fastening holes (138*a*) of the movable member-side fastening block (138) such that the fastening members (170) can be inserted thereinto. As described above, since three stationary members (110) may be coupled to a single movable member (130), three movable member-side fastening blocks (138) may be disposed with respect to a single movable member (130). The three movable member-side fastening blocks (138) may be disposed at portions where the coupling holes (136*a*, 136*b*) are formed, that is, at the central portion and the opposite ends of the movable member body (132), respectively.

The movable member-side fastening blocks (138) and the movable member body (132) may be integrally formed with one another or may be manufactured as separate components to be assembled with one another. The movable member-side fastening blocks (138) may be manufactured using a material, for example, stainless steel (STS), which can maintain the fastening state of the fastening members (170).

The bent portion of the movable member body (132) may be provided with a high density insulator (140) having a curved surface so as to support the membranes (primary and secondary curved portions). The high density insulator (140) may be formed with a concave portion (142) into which the movable member-side fastening blocks (138) are inserted. The high density insulator (140) may be manufactured using high density foam.

As shown in FIG. 4 and FIG. 8, according to the embodiment of the invention, the corner structure (100) may be simply manufactured by fastening the stationary members (110) to the movable member (130) using the fastening members (170). That is, the stationary member body (112) and the movable member body (132) each bent in an L shape are brought into contact with each other at the bent portions thereof to form a cross (+) shape in side view and are coupled to each other using the fastening members (170). The fastening members (170) may be, for example, wrench bolts.

Here, the fastening members (170) may be inserted into the stationary member-side fastening block (116) disposed at the curved portion of the stationary member body (112) and into the movable member-side fastening block (138) disposed at the bent portion of the movable member body (132), thereby firmly maintaining a coupled state therebetween. More specifically, each of the fastening members (170) may be sequentially inserted and secured into the fastening hole (138*a*) formed on the movable member-side fastening block (138), the coupling holes (136*a*, 136*b*) formed on the movable member body (132), the through-hole (112*a*) formed through the stationary member body (112), and the fastening hole (116*a*) formed on the stationary member-side fastening block (116). For screw fastening of the fastening member (170), at least the fastening holes (116*a*) formed on the stationary member-side fastening block (116) may be formed on an inner peripheral surface thereof with female threads.

As described above, since the coupling holes (136*b*) formed at the opposite ends of the movable member among the coupling holes (136*a*, 136*b*) formed on the movable member body (132) has an elongated-hole shape, relative displacement between the stationary members (110) and the movable member (130) is allowed even in a state that the stationary members (110) are coupled to the movable member (130) by the fastening members (170). Accordingly, relative displacement between the stationary members (110) and the movable member (130) caused by external force such as thermal deformation can be absorbed.

As described above, the storage tank (10) is sealed in a liquid-tight state by the primary and secondary membranes (51, 52). That is, in the storage tank (10), multiple metal boards may be integrally connected to each other by welding to form one storage space surrounded by double sealing walls, whereby the storage tank (10) can store and transport liquefied gas without leakage.

The primary membrane (51) directly contacting liquefied gas, such as LNG, in a cryogenic state and the secondary membrane (52) spaced apart from the primary membrane (51) may be formed with corrugations to resist against temperature change according to loading or unloading of the LNG, as well-known in the art.

Such primary and secondary membranes (51, 52) are connected to the hull of the ship, that is, to the inner wall (12) or the partition (14) by multiple corner structures (100) and anchor structures (not shown).

The insulating members (150) are arranged between the secondary membrane (52) and the inner wall (12) or the partition (14) to form an insulating layer. The insulating members (150) may be included in the corner structures (100) disposed at corners of the storage tank (10), anchor structures (not shown) disposed around anchor members, and planar structures (not shown) disposed on a flat portion of the storage tank (10). That is, an overall insulating layer may be formed on the storage tank (10) by arranging the corner structures (100), the anchor structures and the planar structures.

Each of the corner structures (100), the anchor structure and the planar structures arranged on the storage tank (10)

may be manufactured as a single module at a separate location outside the storage tank (10) and then may be conveyed to the storage tank (10) to be assembled therein. Workability can be improved in manufacture of an LNG storage tank through such modularization.

For the corner structure (100), a corner structure module is manufactured at a separate location outside the storage tank (10) to have a length corresponding to the length of the movable member (130), that is, at a factory or the like and is then conveyed into the storage tank to be mounted at a corner of the storage tank. When the corner structure (100) is manufactured as a module so as to correspond to the length of the movable member, it is possible to solve a leveling problem that can occur upon mounting the movable member on the stationary members after installation of the stationary members inside the storage tank.

The primary and secondary membranes (51, 52) are supported by the corner structure (100) and the anchor structure, and the planar structure merely supports only the load of LNG applied to the primary and secondary membranes (51, 52). In addition, there is no direct coupling relationship between the planar structure and the corner structure (100) or between the planar structure and the anchor structure.

As described above, the corner structure (100) according to the embodiment of the invention includes the stationary members (110) and the movable member (130) to provide direct connection between the hull and the primary and secondary membranes (51, 52) and further includes the insulating members (150) formed to fill an empty space around the stationary member (110).

The insulating members (150) may be manufactured using an insulator (151), such as polyurethane foam, reinforced polyurethane foam, and the like. Plywood (152) may be attached to one surface of the insulator, opposite surfaces thereof or multiple surfaces thereof. However, it should be understood that the present invention is not limited to the material and structure of the insulating members (150) in the corner structure (100).

With the above structure, the corner structure (100) is secured to an inner surface of the storage tank (10) (for example, the inner wall (12) or the partition (14) of the hull) through the stationary members (110) of the corner structure (100).

In addition, as well-known in the art, a leveling material (not shown) for leveling may be interposed between the plywood attached to the insulating member (150) and the inner surface of the storage tank (10), as needed.

Further, as described above, the movable member (130) of the corner structure is formed with the primary joining portion and the secondary joining portion with a constant height difference therebetween. The primary membrane (51) is attached to the primary joining portion (the surface of the protrusion (134)) by welding and the secondary membrane (52) is attached to the secondary joining portion (the surface of the movable member body (132)) by welding.

As shown in FIG. 4 and FIG. 5, the primary membrane (51) is spaced apart from the secondary membrane (52) by a constant separation distance. Preferably, the separation distance is the same as the height of the protrusion forming the primary joining portion of the corner structure (100). In order to maintain the constant separation distance between the primary membrane (51) and the secondary membrane (52), the support board (53) having a constant thickness is interposed between the primary membrane (51) and the secondary membrane (52).

The support board (53) may be interposed therebetween over an entire remaining region or over some of the entire remaining region, except for a region in which the primary and secondary membranes (51, 52) are arranged parallel to each other, that is, a corrugated region.

As the support board (53), a board composed of plywood having a constant thickness alone, a board composed of polyurethane foam (or reinforced polyurethane foam) having a constant thickness alone, or a board of plywood attached to polyurethane foam (or reinforced polyurethane foam) may be used.

Figure 2:
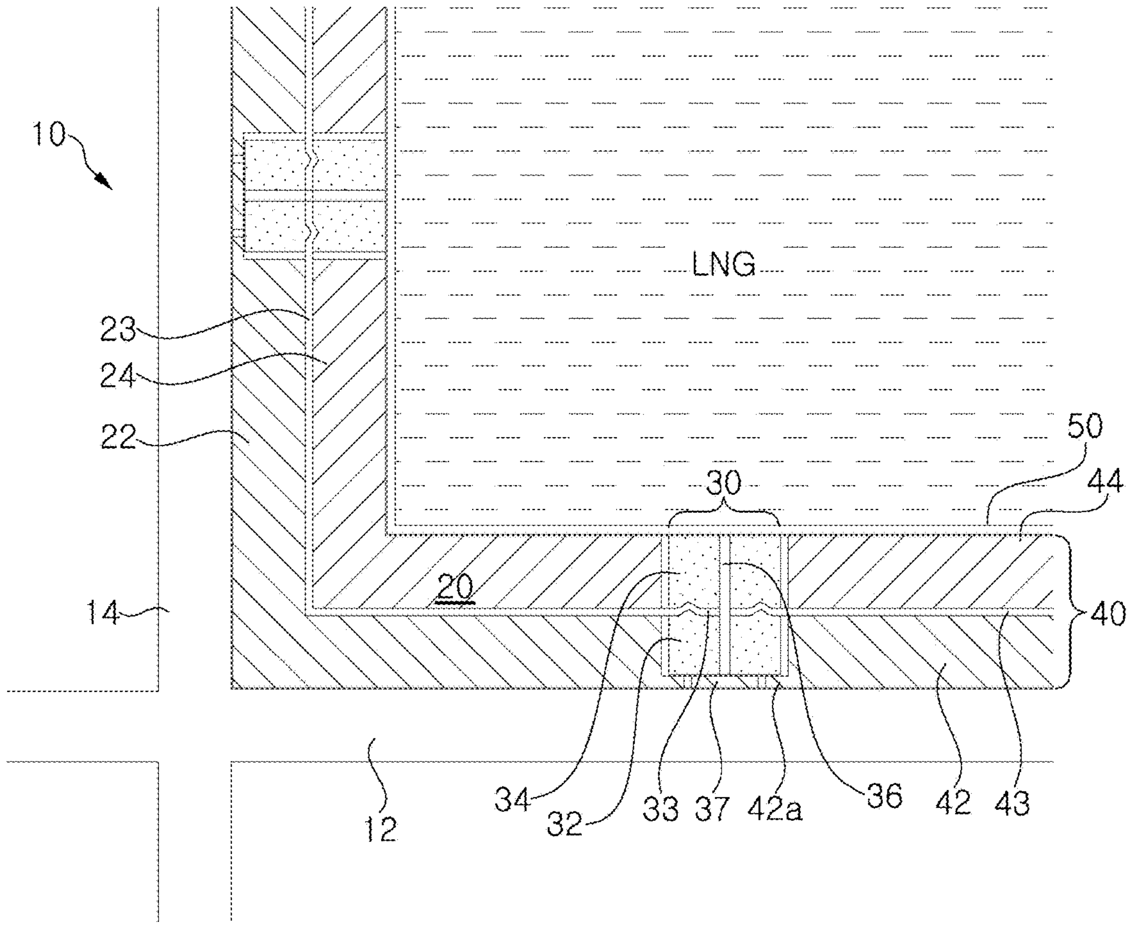
FIG. 2 (Prior Art)
FIG. 2 is a sectional view of a portion of a typical LNG storage tank.

As described above, according to the embodiment, the primary membrane (51) is spaced apart from the secondary membrane (52) without any insulator therebetween excluding the support board (53). As described above with reference to FIG. 2, since a primary insulating wall is interposed between a primary sealing layer directly contacting LNG and a secondary sealing layer in most typical insulating wall structures, the most typical insulating wall structures require a complicated structure to support the primary sealing layer through the primary insulating wall by the secondary sealing layer. However, since the corner structure (100) according to the present invention does not include a separate insulator for heat insulation between the primary and secondary membranes (51, 52), the primary and secondary membranes (51, 52) can be easily supported by the primary and secondary joining portions of the movable member (130).

Further, according to the present invention, since the primary membrane (51) is spaced apart from the secondary membrane (52), even when the storage tank is deformed through deformation of the hull due to external forces, such as waves and the like, friction does not occur between the primary and secondary membranes (51 and 52), and even when a membrane at one side of the storage tank is damaged due to application of impact thereto, it is possible to prevent direct propagation of damage to a membrane at the other side thereof.

On the other hand, although sealing is realized by the double structure of the primary and secondary membranes (51, 52), it should be understood that a multilayer structure including three or more layers may be used.

According to the present invention, the movable member (130) having the primary and secondary membranes (51, 52) joined thereto is connected to the stationary member (110) through the coupling holes (**136*b*) having an elongated shape to allow minute displacement, as described above, the primary and secondary membranes (51, 52) can be stably supported with respect to the hull. Accordingly, the corner structure (100**) can absorb stress generated due to thermal deformation upon loading or unloading of LNG or due to deformation of the hull by waves caused by external force, such as waves and the like.

In this embodiment, although the stationary member is described as being secured to the inner surface of the hull by mechanical fastening members, such as bolts and nuts, it should be understood that the stationary member may be secured thereto by direct welding.

The corner structures may be manufactured as modules at a separate location and may be conveyed into a storage tank of a ship to be arranged and assembled with each other inside the storage tank.

In addition, according to the embodiment, the membranes are made of, for example, corrugated stainless steel used for GTT Mark-III type. However, it should be understood that the membranes may be made of, for example, Invar steel used for No. 96 of GTT.

Furthermore, it should be understood that the corner structure according to the present invention may be applied not only to liquefied gas storage tanks installed inside hulls of ships but also to onshore liquefied gas storage tanks.

The invention claimed is:

1. A corner structure disposed at a corner of a liquefied gas storage tank and supporting a sealing wall adapted to prevent leakage of liquefied gas, the corner structure comprising:

a stationary member secured to an inner surface of a hull structure wall;

a movable member disposed on the stationary member such that the sealing wall is joined to the movable member; and an insulating member interposed between the sealing wall and the hull structure wall, wherein the stationary member comprises a stationary member body bent at a curved portion thereof in an opposite direction to the movable member and the movable member comprises a movable member body bent at a bent portion thereof in an opposite direction to the stationary member; and wherein the stationary member is coupled to the movable member by a fastening member penetrating the curved portion and the bent portion, wherein one movable member is coupled to the hull structure wall through multiple stationary members, and wherein:

the stationary members are coupled to a central portion and opposite ends of the movable member, respectively;

the movable member body is formed at the central portion and the opposite ends with coupling holes through which fastening members pass, respectively, for coupling between the stationary members and the movable member; and the coupling hole formed at the central portion of the movable member body has a circular shape and the coupling holes formed at the opposite ends of the movable member body have an elongated-hole shape extending in a longitudinal direction of the movable member body.

2. The corner structure according to claim 1, wherein:

the stationary member comprises a secured portion fixedly mounted on the hull structure wall and flanges formed at opposite ends of the stationary member body to be coupled to the secured portion; and the secured portion comprises a stud inserted into securing holes formed in the flanges.

3. The corner structure according to claim 2, wherein the stationary member further comprises a fitting member of plywood interposed between the secured portion and the flanges upon coupling between the secured portion and the flanges.

4. The corner structure according to claim 1, wherein the stationary member further comprises a stationary member-side fastening block disposed at the curved portion of the stationary member body to allow the fastening member having passed through the movable member body and the stationary member body to be fastened to the stationary member-side fastening block, the stationary member-side fastening block being disposed on an opposite surface to the movable member at the curved portion of the stationary member body.

5. The corner structure according to claim 4, wherein the movable member further comprises a movable member-side fastening block at the bent portion of the movable member body to allow the fastening member having passed through the movable member body and the stationary member body to be inserted into the movable member-side fastening block, the movable member-side fastening block being disposed on an opposite surface to the stationary member at the bent portion of the movable member body.

6. The corner structure according to claim 1, wherein:

the movable member further comprises a joining portion to which the sealing wall is joined; and the joining portion comprises a primary joining portion and a secondary joining portion with a height different therebetween, and the sealing wall comprises a primary membrane directly contacting liquefied gas and a secondary membrane spaced apart from the primary membrane by a constant distance, the primary membrane being joined to the primary joining portion and the secondary membrane being joined to the secondary joining portion.

7. The corner structure according to claim 6, wherein the primary joining portion is formed on a protrusion protruding from a surface of the movable member body and the secondary joining portion is formed on the surface of the movable member body.

8. The corner structure according to claim 1, wherein the movable member further comprises a high density insulator disposed at the bent portion of the movable member body and supporting the sealing wall.

9. A liquefied gas storage tank including a corner structure disposed at a corner thereof to support a sealing wall adapted to prevent leakage of liquefied gas, the corner structure comprising:

a stationary member secured to an inner surface of a hull structure wall;

a movable member disposed on the stationary member such that the sealing wall is joined to the movable member, wherein the movable member comprises a movable member body bent at a bent portion thereof in an opposite direction to the stationary member; and an insulating member interposed between the sealing wall and the hull structure wall, and wherein the stationary member is coupled to the movable member by a fastening member penetrating the stationary member and the movable member, wherein one movable member is coupled to the hull structure wall through multiple stationary members, and wherein:

the stationary members are coupled to a central portion and opposite ends of the movable member, respectively;

the movable member body is formed at the central portion and the opposite ends with coupling holes through which fastening members pass, respectively, for coupling between the stationary members and the movable member; and the coupling hole formed at the central portion of the movable member body has a circular shape and the coupling holes formed at the opposite ends of the movable member body have an elongated-hole shape extending in a longitudinal direction of the movable member body.

10. The liquefied gas storage tank according to claim 9, wherein the sealing wall comprises a primary membrane directly contacting liquefied gas and a secondary membrane spaced apart from the primary membrane by a constant distance, and a support board is interposed between the primary membrane and the secondary membrane to maintain a constant distance therebetween.

* * * * *